Mar. 3, 1925.
W. FLEISCHER
1,528,249
BRAKE CONNECTION FOR AUTOMOBILES
Filed March 20, 1924
Fig-1
Fig-2
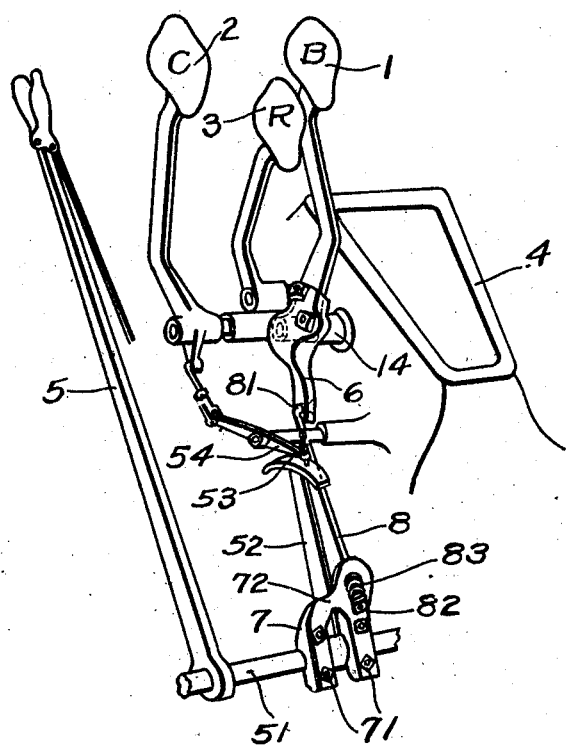
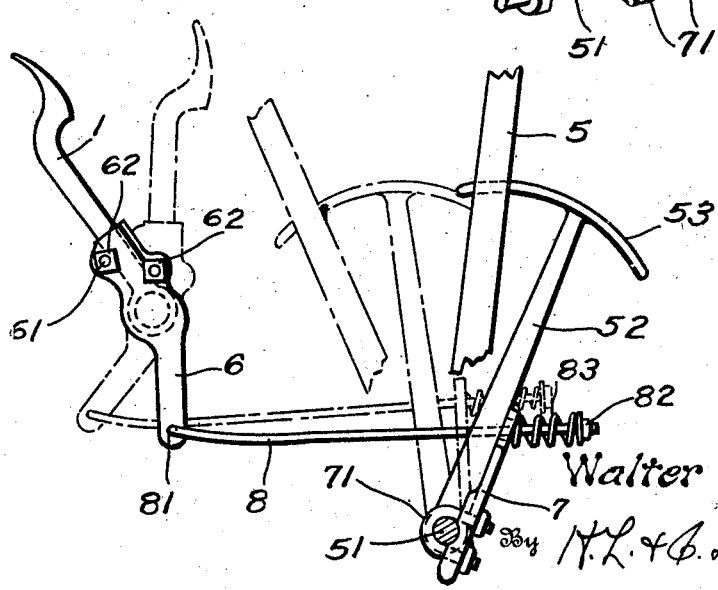
Inventor
Walter Fleischer
By H.L. & C.L. Reynolds
Attorney Patented Mar. 3, 1925.

1,528,249

UNITED STATES PATENT OFFICE.

WALTER FLEISCHER, OF EMANDER, WASHINGTON.

BRAKE CONNECTION FOR AUTOMOBILES.

Application filed March 20, 1924. Serial No. 700,490.

*To all whom it may concern:*

Be it known that I, WALTER FLEISCHER, a citizen of the United States of America, and resident of the town of Emander, in the county of Snohomish and State of Washington, have invented certain new and useful Improvements in Brake Connections for Automobiles, of which the following is a specification.

My invention relates to a device which is particularly intended for application to the braking system of Ford automobiles.

It is my object to provide means whereby application of the hub brakes, commonly known as the wheel or emergency brakes, will serve to apply also the transmission brake, commonly called the service or foot brake, or which by proper adjustment will operate upon movement of the hand brake lever to apply only the transmission brake, and in this manner to save wear on the wheel brakes, which ordinarily are easily worn out.

A further object is the provision of a device of this sort which, even though it be adjusted to apply only the transmission brake, may be operated in case of emergency to apply both brakes, thus to insure greater safety of the car.

It is a particular object of my invention to provide means intended for attachment to a transmission brake pedal, and to the rock shaft upon which the hand brake lever is secured, and which is so associated with a clutch-releasing cam arm, also mounted upon the same rock shaft, that the transmission brake will be applied after a predetermined angular movement of the rock shaft and yet applied through resilient means to avoid breakage of parts, and to insure substantially equal braking effects notwithstanding variations in adjustment of the connections between the two brakes.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is a perspective view of my device, and Figure 2 is a side elevation thereof.

In Ford automobiles there are three control pedals, the brake pedal 1, the clutch pedal 2, and the reverse pedal 3, all of which are journaled in the transmission casing 4. The brake pedal 1 is journaled at 14 and serves, when depressed, that is when pushed forward, to apply a brake to the transmission within the casing 4, as is well-known. The hand or emergency brake lever 5 is secured upon a rock shaft 51 which passes beneath the transmission casing 4 and which is connected by means not shown to the hub or wheel brakes upon the rear wheels. An arm 52 is also secured upon the rock shaft 51, this arm carrying a cam 53 which operates upon a lever 54 connected to the clutch pedal 2 to throw the clutch into neutral position upon application of the so-called emergency brake.

To the brake pedal 1 I secure a member forming a downward extension 6. This may be secured in any suitable manner, as, for example, by a U-bolt 61 embracing the pedal 1 and passing through the member 6, the same being secured by suitable nuts 62. Upon the rock shaft 51 I secure a yoke 7 so that the rock shaft may turn without serving to turn the yoke 7. This may also be secured in any suitable manner, and I have found it convenient to employ similar U-bolts 71 for this purpose, the U-bolts embracing the shaft 51 and passing through the bifurcated legs of the yoke 7. The yoke is divided and the legs pass upon opposite sides of the arm 52 so that the base portion 72, or that which forms the connection between the two legs of the yoke, lies in the path of the arm 52, as the latter is swung rearward.

A hole is provided in the yoke at its upper end and through this hole is passed a link 8, the link being pivotally connected at 81 to the extension member 6. A nut 82 is adjustably threaded upon the rear end of the link 8 and between the nut 82 and the rear face of the yoke 7 I position a spring 83. The spring 83 has a tendency to resist contraction.

As I prefer to have the parts adjusted, the yoke 7 does not lie normally in contact with the arm 52 but is engaged thereby shortly after movement of the arm 52 commences. If the spring 83 is made fairly stiff, movement of the arm 52 is immediately communicated through the link 8 and member 6 to the brake pedal 1. Continued movement sets the transmission brake 1, although such movement may not be sufficient to set the wheel brakes. By adjustment of the nut 82, this movement may, if desired, serve to set both the transmission and wheel brakes at the same time. However, even though the wheel brakes are not set, in case of emergency, and when an extraordinary pull is given the hand brake lever 5, the spring 83 is contracted and this serves to set both the transmission brake and later, through contraction of the spring 83, to set also the wheel brakes.

The connection 72 of the yoke lies always in the path of the cam arm 52 and is always certain to be engaged thereby. It is not left unseated but is permanently secured upon the rock shaft and is always in position for use, though the car may be traveling over very rough roads. Further the resilient connection between the two brakes ensures proper functioning of both brakes, and eliminates breakage of parts through too sudden application of the brakes. Also even though one set of brakes may accidentally be out of working order, a pull on the hand brake lever 5 is sure to bring the other brake into operation.

What I claim as my invention is:

1. In combination with a brake pedal, a hand brake lever, a transverse rock shaft to which said hand brake lever is secured, and an arm fixed on said rock shaft, an extension secured to said brake pedal, a link pivotally connected to said extension and extending therefrom past said arm, and a bifurcated yoke mounted upon said rock shaft and spanning said arm, said link and yoke being operatively connected.

2. In combination with a brake pedal, a hand brake lever, a transverse rock shaft to which said hand brake lever is secured, and an arm fixed on said rock shaft, an extension secured to said brake pedal, a link pivotally connected to said extension and extending therefrom past said arm, said yoke having a hole, said link passing therethrough, and a spring interposed between said link and yoke.

3. In combination with a brake pedal, a rock shaft rearwardly thereof and a hand brake lever and an arm secured upon said rock shaft, a member secured upon and extending downward from the pivot axis of said pedal, a rearwardly extending link pivotally connected to the lower end of said extension, and a bifurcated yoke mounted upon said rock shaft, and spanning said arm, said arm, when swung rearwardly, engaging the connection between the legs of said yoke to swing the latter rearwardly, the rear end of said link being connected to said yoke to be pulled rearwardly thereby when the yoke is swung rearwardly.

4. In combination with a brake pedal, a rock shaft rearwardly thereof and a hand brake lever and an arm secured upon said rock shaft, a member secured upon and extending downward from the pivot axis of said pedal, a rearwardly extending link pivotally connected to the lower end of said extension, and a bifurcated yoke mounted upon said rock shaft, and spanning said arm, said arm, when swung rearwardly engaging the connection between the legs of said yoke to swing the latter rearwardly, said yoke having a hole receiving the rear end of said link, a nut threaded on the rear end of said link, and a spring interposed between said nut and the rear face of the yoke.

Signed at Everett, Snohomish County, Washington, this 13th day of March, 1924.

WALTER FLEISCHER.